(12) United States Patent
Makita et al.

(10) Patent No.: US 9,139,068 B2
(45) Date of Patent: Sep. 22, 2015

(54) MIX DOOR AND VEHICLE AIR CONDITIONER USING THE SAME

(75) Inventors: Yuki Makita, Saitama (JP); Shizuka Yanashima, Saitama (JP)

(73) Assignee: Calsonic Kansei Corporation, Saitama-shi (JP)

( * ) Notice: Subject to any disclaimer, the term of this patent is extended or adjusted under 35 U.S.C. 154(b) by 508 days.

(21) Appl. No.: 13/543,542

(22) Filed: Jul. 6, 2012

(65) Prior Publication Data
US 2013/0008203 A1    Jan. 10, 2013

(30) Foreign Application Priority Data

Jul. 7, 2011  (JP) .................................. 2011-151073
Jul. 7, 2011  (JP) .................................. 2011-151075

(51) Int. Cl.
*F25B 19/00*        (2006.01)
*B60H 1/00*         (2006.01)

(52) U.S. Cl.
CPC ........ *B60H 1/00692* (2013.01); *B60H 1/00857* (2013.01)

(58) Field of Classification Search
CPC ......................... B60H 1/00692; B60H 1/00857
USPC ................ 62/187, 269, 515; 454/121; 49/358
See application file for complete search history.

(56) References Cited

U.S. PATENT DOCUMENTS

| 2003/0145978 A1* | 8/2003 | Tsurushima et al. ......... 165/11.1 |
| 2006/0144582 A1* | 7/2006 | Sekiya et al. ................. 165/202 |
| 2007/0111651 A1  | 5/2007 | Sekito et al. |
| 2009/0241574 A1* | 10/2009 | Ozeki et al. ..................... 62/239 |
| 2011/0076931 A1  | 3/2011 | Ikeda |

FOREIGN PATENT DOCUMENTS

| CN | 2839869 Y    | 11/2006 |
| CN | 101135472 A  | 3/2008 |
| CN | 102032656 A  | 4/2011 |
| JP | H04297319 A  | 10/1992 |
| JP | 2001-270317 A | 10/2001 |
| JP | 2007118753 A | 5/2007 |
| JP | 4496546 B2   | 7/2010 |
| WO | 2007/061039 A1 | 5/2007 |

* cited by examiner

*Primary Examiner* — Emmanuel Duke
(74) *Attorney, Agent, or Firm* — Locke Lord LLP; James E. Armstrong, IV; Brian S. Matross

(57) ABSTRACT

A mix door includes a slide door unit, a slide driving part configured to drive the slide door unit, and a gear cover partially covering the slide driving part. The slide driving part includes a gear mechanism portion formed of a rack portion and a gear portion. The gear cover is provided to cover the gear portion.

7 Claims, 10 Drawing Sheets

MIX DOOR AND VEHICLE AIR CONDITIONER USING THE SAME

CROSS REFERENCE TO RELATED APPLICATIONS

The present application is based on and claims priority from each of Japanese Patent Application Number 2011-151073, filed on Jul. 7, 2011, and Japanese Patent Application Number 2011-151075, filed on Jul. 7, 2011, the disclosure of which is hereby incorporated by reference herein in its entirety.

BACKGROUND OF THE INVENTION

1. Field of the Invention

The present invention relates to a mix door and a vehicle air conditioner using the same.

2. Description of the Related Art

A vehicle such as an automobile is provided with an air conditioning device (hereafter, referred to as air conditioner) (for reference, see International Patent Application Publication No. WO20071061039 and Japanese Patent Application Publication No. 2001-270317).

The air conditioner includes an air conditioner main body installed in a front portion of a vehicle cabin and ducts for sending air for air conditioning from the air conditioner main body to blow-out ports provided in corresponding portions of the vehicle cabin.

The air conditioner main body includes a hollow air-conditioner housing and an air intake port and an air discharge port which are provided in the air conditioner housing.

The hollow air conditioner housing includes an evaporator (heat exchanger for cooling) and a heater core (heat exchanger for heating) disposed in this order from a windward (upwind) side in an inner portion of the hollow air conditioner housing. A leeward (downwind) side of the evaporator is divided into a warm air passage and a bypass passage, and the heater core is provided inside the warm air passage. A mix door capable of distributing air for air conditioning having passed through the evaporator to the warm air passage and the bypass passage is provided between the evaporator and the heater core.

The mix door mentioned above includes slide door units each having: a frame-shaped slide door case having a warm air opening portion and a cool air opening portion; and a slide door part capable of opening and closing the warm air opening portion and the cool air opening portion or adjusting the opening degrees thereof by sliding along the slide door case.

The slide door units each include a door attachment wall part which enables the slide door part to be attached to the slide door case. Moreover, the slide door units each include a slide guide part which slideably supports the slide door part. Furthermore, a slide driving part capable of driving a slide of the slide door part is provided on the upwind side of the slide door units.

The slide driving part includes a rack portion and a gear mechanism portion, the rack portion being provided in the slide door part and extending in a sliding direction, the gear mechanism portion being configured to transmit a driving force to the rack portion.

The air conditioner main body mentioned above is configured to be assembled as follows. For example, left and right housing divided pieces into which the air conditioner housing is divided are mounted to the mix door. Then, the evaporator and the heater core are inserted from an opening portion formed in a side surface of the air conditioner housing. Thereafter, the opening portion is closed by a side surface member and air delivery units of the air intake ports and the air discharge port and the like are attached.

However, in the mix door structure as described in International Patent Application Publication No. WO2007/061039, the rack portion and the gear mechanism portion of the slide driving part are provided in a center portion of the slide door case in a width direction. Hence, the air for air conditioning is easy to blow directly on the gear mechanism portion (on a gear portion provided therein). Therefore, there are risks that foreign objects such as debris and dust carried by the air for air conditioning are caught by the gear portion and that the gear portion located in the flow of the air for air conditioning causes wind noise and an increase in flow resistance.

Furthermore, in the vehicle-air-conditioner as described in International Patent Application Publication No. WO2007/061039, the mix door and the evaporator are disposed in the air conditioner housing at positions extremely close to each other. Hence, when the evaporator is inserted into the air conditioner housing, there is a risk of the evaporator being damaged by the mix door.

SUMMARY OF THE INVENTION

To solve the problems described above, the present invention provides a mix door structure in which: a slide door unit including a frame-shaped slide door case and a slide door part is provided, the slide door case having a warm air opening portion and a cool air opening portion, the slide door part capable of opening and closing the warm air opening portion and the cool air opening portion or adjusting the opening degrees thereof by sliding along the slide door case; a slide driving part capable of driving a slide of the slide door part is provided on the upwind side of the slide door unit; the slide driving part includes a rack portion and a gear mechanism portion, the rack portion provided in the slide door part and extending in a sliding direction, the gear mechanism portion configured to transmit a driving force to the rack portion. In the mix door structure, a gear cover is provided which covers at least part of a gear portion provided in the gear mechanism portion.

Moreover, the present invention provides a vehicle air conditioner configured such that an evaporator and a mix door are installed close to each other in this order from the upwind side inside a hollow air conditioner housing and that the evaporator is mounted into the air conditioner housing from an opening portion provided in a side surface of the air conditioner housing. In the vehicle air conditioner, a damage prevention guide portion is provided in a portion of the mix door closest to the evaporator, the damage prevention guide portion being capable of preventing damage on the evaporator by guiding the evaporator when the evaporator is inserted.

In the present invention, the following effects can be obtained from the configurations described above. Specifically, covering at least part of the gear portion provided in the gear mechanism portion with the gear cover can prevent the air for air conditioning from blowing directly on the gear portion. Accordingly, foreign objects such as debris and dust carried by the air for air conditioning can be prevented from being caught by the gear portion. Moreover, an increase in flow resistance and wind noise which are caused by the gear portion can be prevented.

Moreover, the evaporator can be guided by the damage prevention guide portion provided in the portion of the mix door closest to the evaporator, in such a way that the evaporator is not damaged when being inserted into the air conditioner housing.

DETAILED DESCRIPTION OF THE PREFERRED EMBODIMENTS

Preferred embodiments of the present invention will be explained hereinafter with reference to the accompanying drawings.

FIGS. 1 to 11 illustrate embodiments and modifications of the present invention.

Embodiment 1

<Configuration> A configuration is described below.

Figure 1:
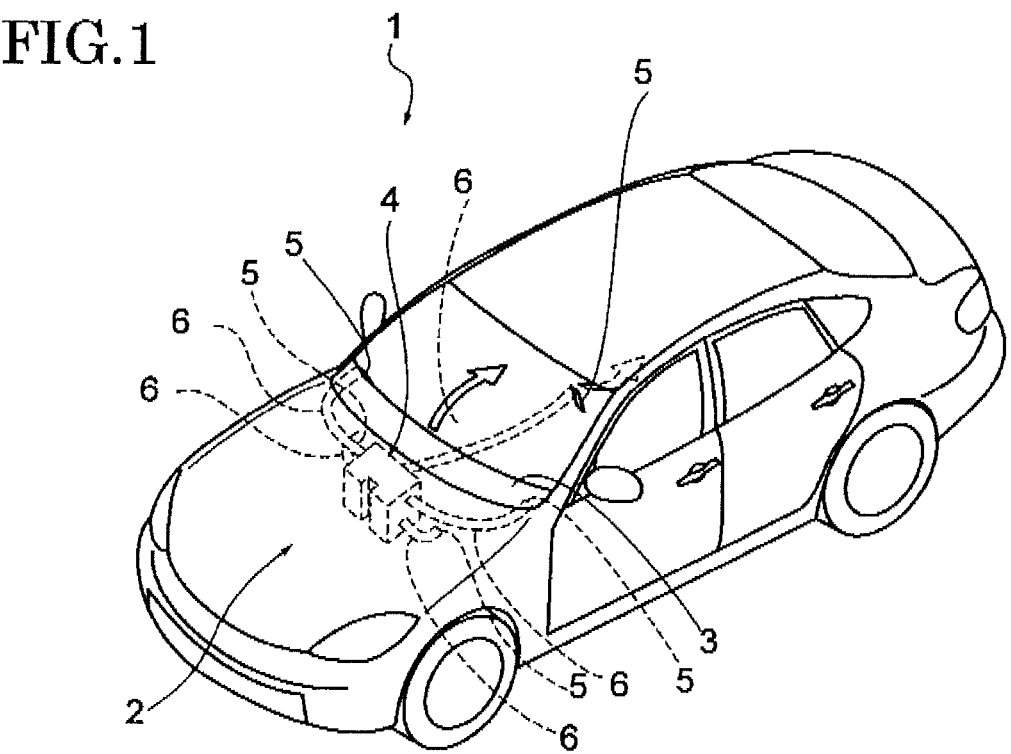
FIG. 1 is a perspective view of a vehicle provided with an air conditioner of an embodiment of the present invention.
Figure 2:
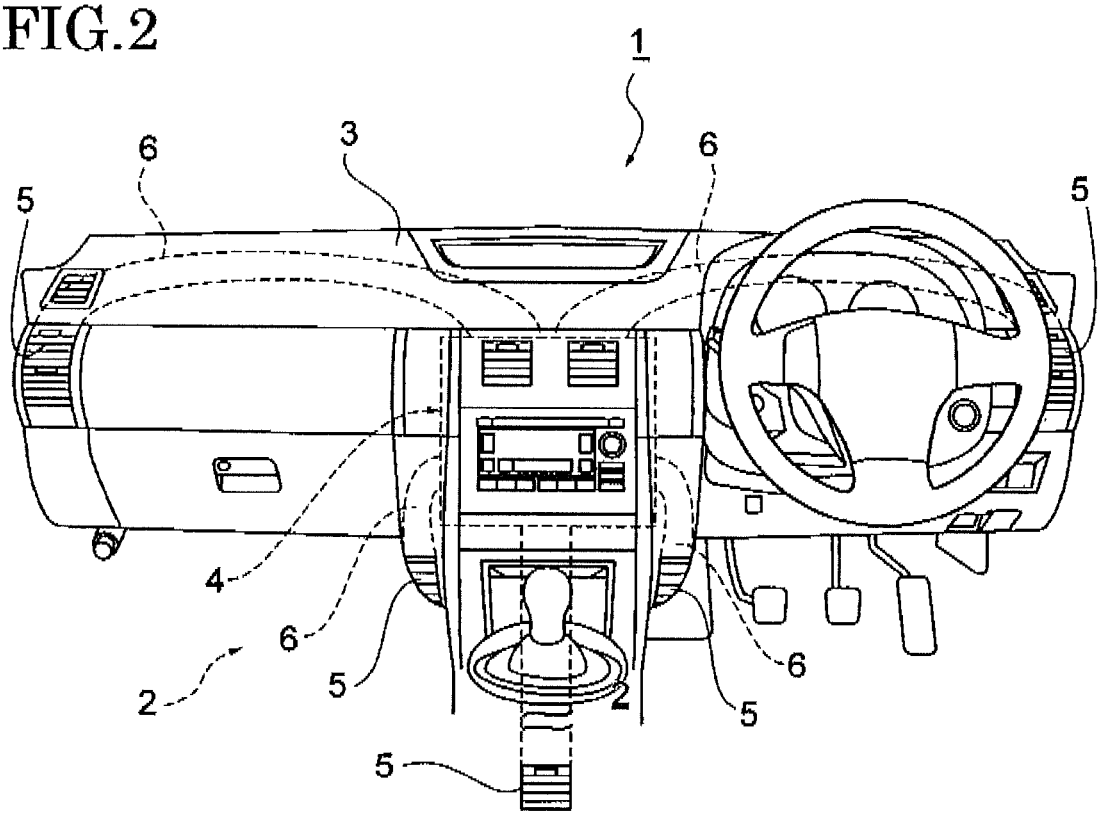
FIG. 2 is a view of an instrument panel in FIG. 1 seen from a passenger side.

As shown in FIGS. 1 and 2, a vehicle 1 such as an automobile is provided with an air conditioning device (hereafter, referred to as air conditioner 2).

The air conditioner 2 includes an air conditioner main body 4 which is provided inside an instrument panel 3 installed in a front portion of a vehicle cabin and ducts 6 which send air for air conditioning from the air conditioner main body 4 to blow-out ports 5 provided in corresponding portions of the vehicle cabin.

Figure 3:
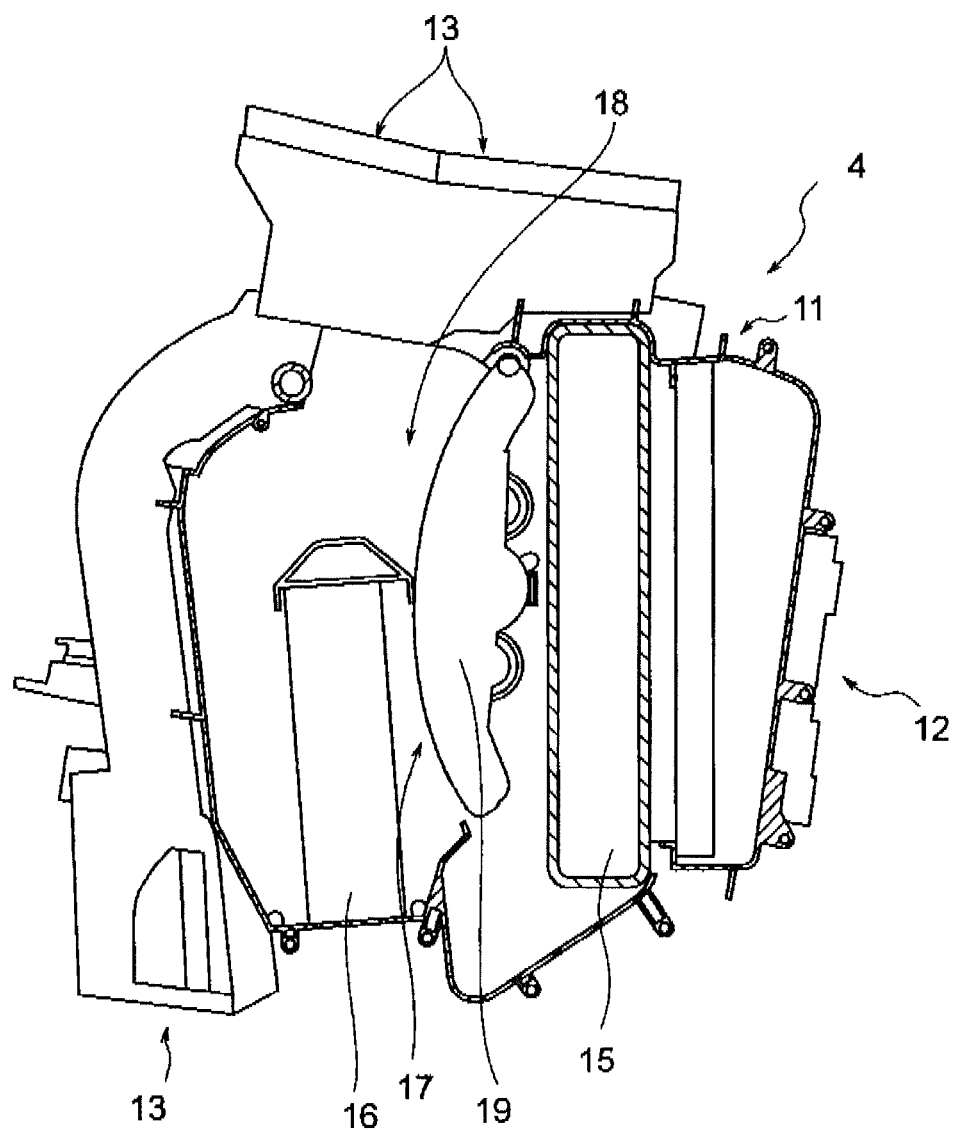
FIG. 3 is a lateral cross-sectional view of an air conditioner main, body in FIG. 1.

As shown in FIG. 3, the air conditioner main body 4 described above includes a hollow air conditioner housing 11 and an air intake port 12 and air discharge ports 13 provided in the air conditioner housing 11.

The hollow air conditioner housing 11 includes inside an evaporator 15 (heat exchanger for cooling) and a heater core 16 (heat exchanger for heating) in this order from the upwind side. A portion on the downwind side of the evaporator 15 is divided into a warm air passage 17 and a bypass passage 18 by a partition wall. The heater core 16 is provided inside the warm air passage 17. A mix door 19 is provided between the evaporator 15 and the heater core 16. The mix door 19 is capable of distributing the air for air conditioning having passed through the evaporator 15 to the warm air passage 17 and the bypass passage 18. In this case, the mix door 19 has an arc shape protruding toward the downwind side in a side view.

The evaporator 15 is configured to cool the air for air conditioning by using evaporative latent heat of coolant used in the air conditioner 2. Moreover, the heater core 16 is configured to heat the air for air conditioning by using heat of cooling water heated by an engine.

Figure 5:
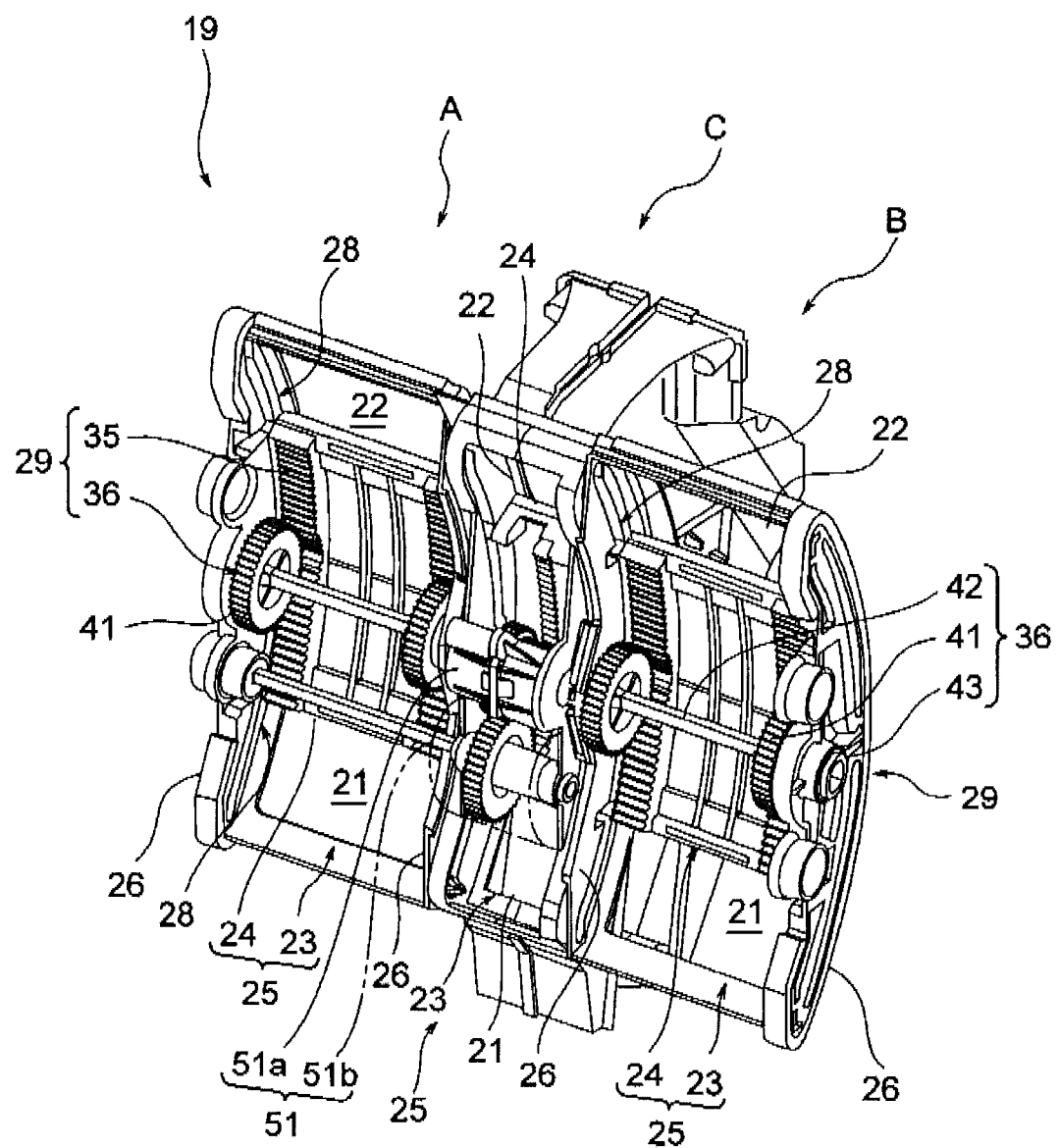
FIG. 5 is a perspective view of a mix door in FIG. 3 seen from a front side of the vehicle.

As shown in FIG. 5, the mix door 19 described above includes slide door units 25 each having: a frame-shaped slide door case 23 having a warm air opening portion 21 and a cool air opening portion 22; and a slide door part 24 capable of opening and closing the warm air opening portion 21 and the cool air opening portion 22 or adjusting the opening degrees thereof by sliding along the slide door case 23 between the warm air opening portion 21 and the cool air opening portion 22.

Each of the slide door units 25 described above includes paired door attachment wall parts 26 which enable the slide door part 24 to be attached to both side portions of the slide door case 23. Moreover, each slide door unit 25 includes a slide guide part 28 slideably supporting the slide door part 24. The slide guide part 28 includes guide pins protruding from both side portions of the slide door part 24 and guide grooves provided in the door attachment wall parts 26.

Moreover, each slide door unit 25 is provided with a slide driving part 29 capable of driving a slide of the slide door part 24.

The slide driving part 29 described above includes rack portions 35 and a gear mechanism portion 36, the rack portions 35 provided in the slide door part 24 and extending in a sliding direction, the gear mechanism portion 36 configured to transmit a driving force to the rack portions 35.

As shown in FIG. 5, the gear mechanism portion 36 is mainly formed of output gears 41 directly meshing with the rack portions 35, an output shaft 42 attached to the centers of the output gears 41, and shaft supporting portions 43 by which the output shaft 42 is supported on the door attachment wall parts 26.

Moreover, the paired rack portions 35 are provided respectively in both side portions of the slide door part 24, the paired output gears 41 are provided near both end portions of the output shaft 42 to correspond with the rack portions 35, and both end portions of the output shaft 42 are pivotally supported by the door attachment wall parts 26 via the shaft supporting portions 43. Furthermore, the output shaft 42 is provided at a position between the warm air opening portion 21 and the cool air opening portion 22 in the sliding direction. This structure achieves such a configuration that air for air conditioning does not directly blow or is less likely to blow on the output gears 41 forming the gear mechanism portion 36. Note that, an unillustrated external driving device is connected to the output shaft 42.

In addition, in the embodiment, an inside of the air conditioner main body 4 is divided into multiple zones and air conditioning can be controlled for each of the zones. For example, the inside of the air conditioner main body 4 may be divided into two zones A and B respectively for a driver seat and a front passenger seat or may be divided into three zones A to C by further adding the zone C for the rear seats. In the case of dividing the inside of the air conditioner main body 4 into the multiple zones A to C, the inside of the air conditioner main body 4 needs to be partitioned according to the number of zones A to C by using partition walls (zone dividing partition walls) and the like. In addition, the mix door 19 also needs to be divided according to the number of zones A to C. For example, independent slide door units 25 are provided respectively for the zones A to C and are integrated by being connected to each other.

Figure 6:
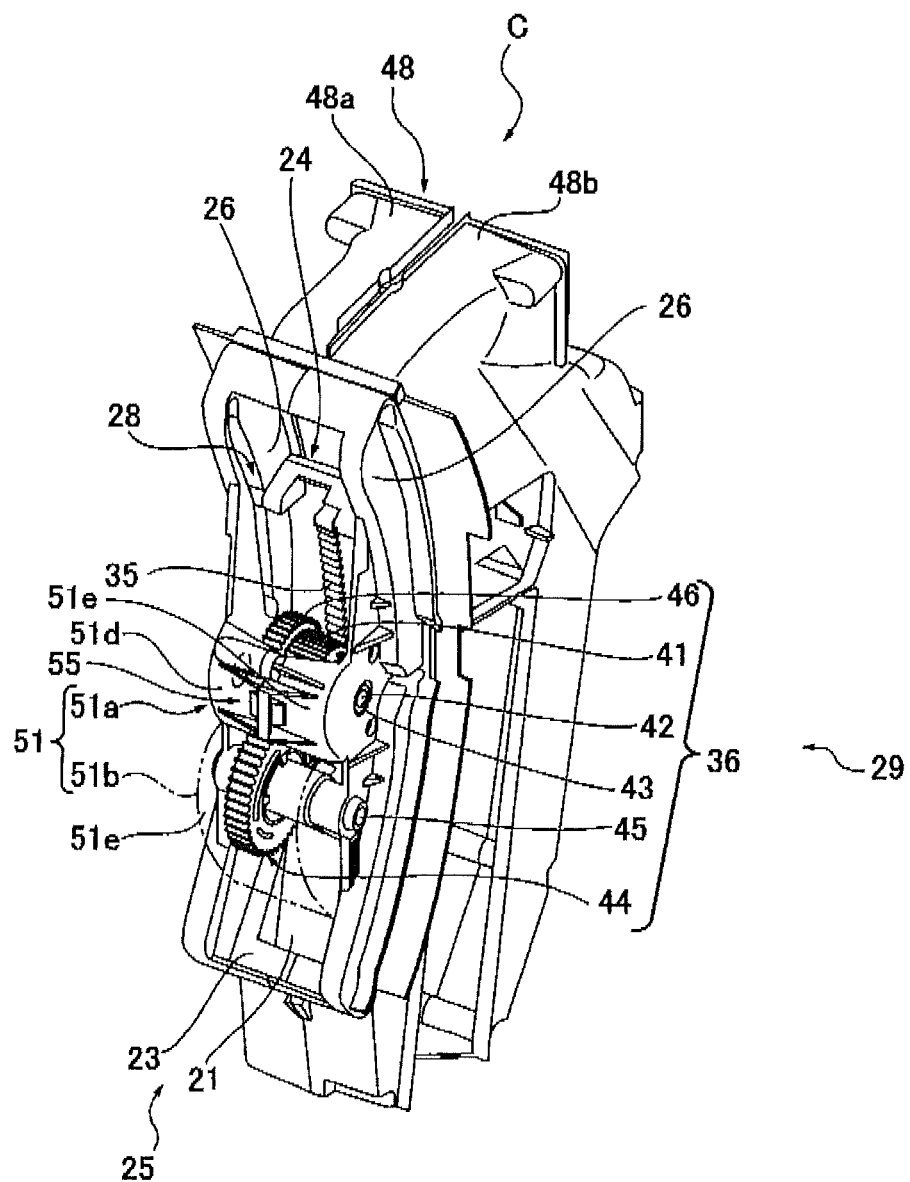
FIG. 6 is a perspective view or a middle slide door unit in FIG. 5.

Due to this configuration, in the slide door unit 25 of the zone C for the rear seats which is located in the middle, the external driving device cannot be directly connected to the output shaft 42 provided at a position between the warm air opening portion 21 and the cool air opening portion 22 as shown in FIG. 6. Hence, for example, an input shaft 45 having an input gear 44 is additionally provided on a side close to the warm air opening portion 21 where the air flow is relatively small, and the output shaft 42 is thus indirectly connected to the external driving device via the input shaft 45. Moreover, if necessary, an intermediate gear 46 meshing with the input gear 44 is attached to the output shaft 42.

In the case of dividing the inside of the air conditioner main body 4 into the multiple zones A to C, since it is difficult for the air conditioner main body 4 to have a large width dimension, the respective zones A to C are required to be small in width dimension. Due to this, in the case of FIG. 5, the slide door unit 25 of the zone C for the rear seats has a smaller width than the slide door units 25 of the zones A and B for the driver seat and the front passenger seat. Since the slide door unit 25 of the zone C for the rear seats has a small width, there is hardly any room or need to provide paired output gears 41 and paired input gears 44 of the gear mechanism portion 96 in both side portions. Hence, one output gear 41 and one input gear 44 are provided in a center portion of the slide door case 23 in the width direction. Therefore, the output gear 41 and the input gear 44 are inevitably disposed in such a way as to be exposed directly to the flow of the air for air conditioning.

Figure 7:
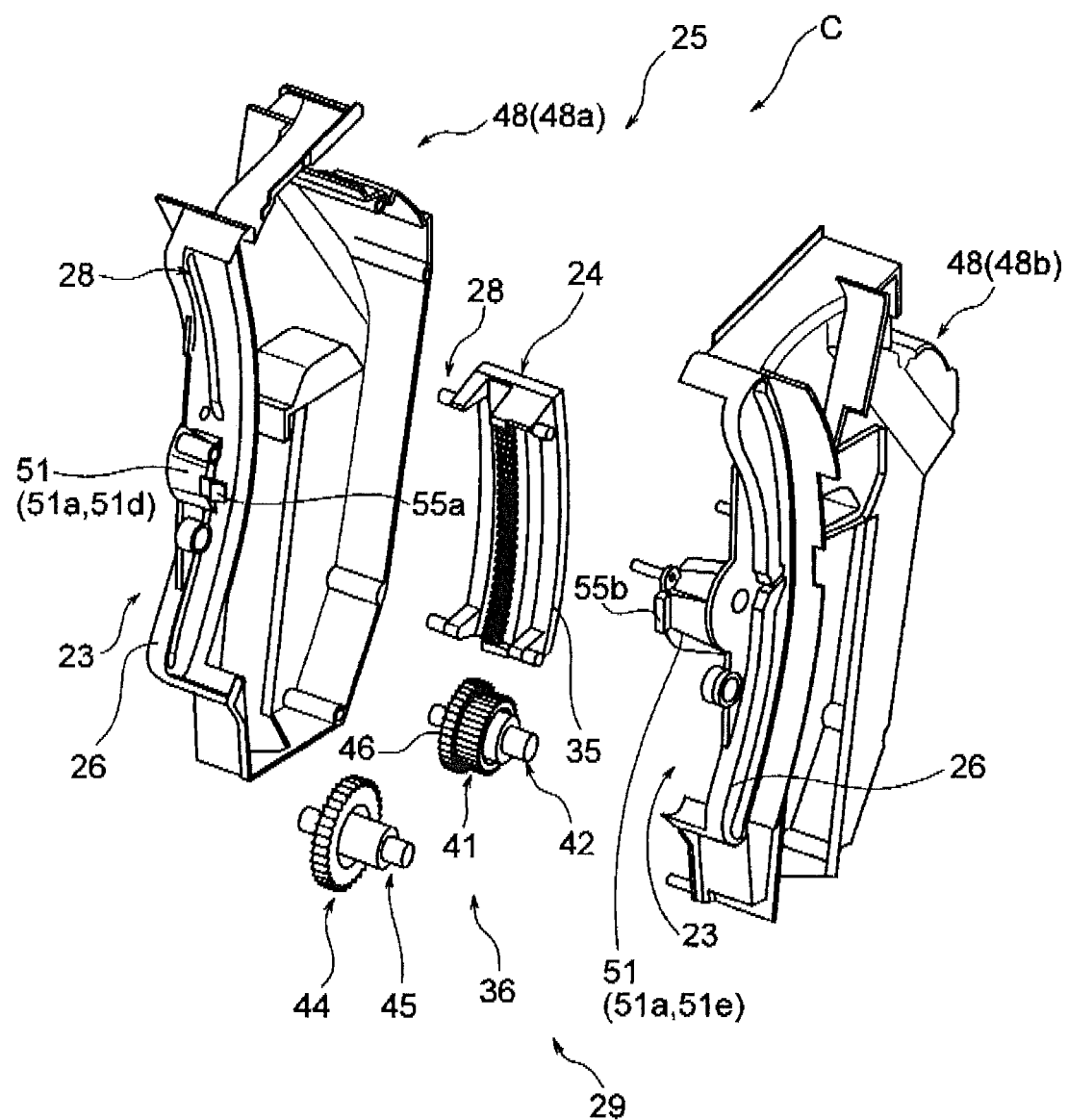
FIG. 7 is an exploded perspective view of a slide door unit in FIG. 6.
Figure 8:
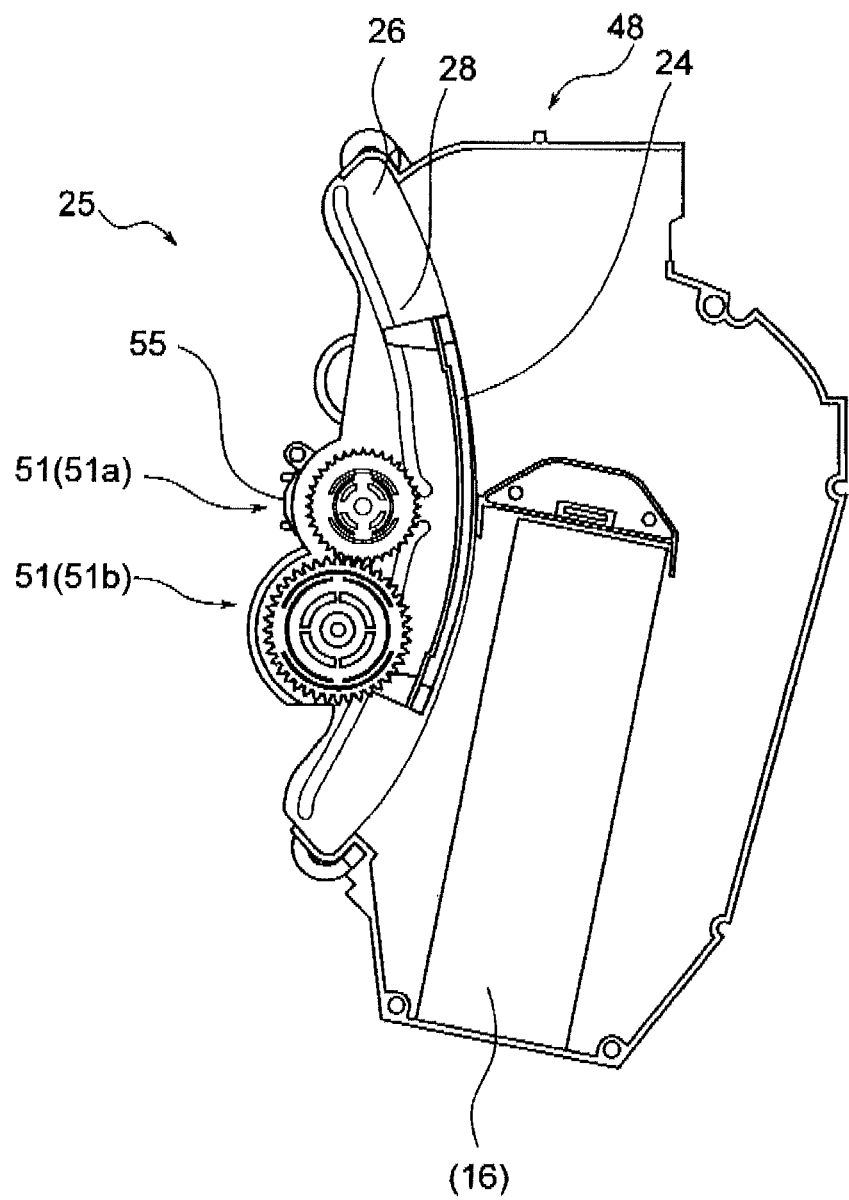
FIG. 8 is a side view of the slide door unit in FIG. 5.

Moreover, (the slide door case 23 of) the slide door unit 25 of the zone C for the rear seats which is located in the middle has a partition wall portion 48 (zone dividing partition wall) integrally attached thereto on the downwind side as shown in FIG. 6 and is divided into left and right divided pieces 48a and 48b together with the partition wall portion 48 as shown in FIG. 7.

In the embodiment, the following configurations are included in the overall configuration described above.

(Configuration 1)

As shown in FIGS. 5 to 8 (mainly refer to FIG. 6), a gear cover 51 is provided which covers at least part of a gear portion (the output gear 41, the input gear 44, and the intermediate gear 46) provided in the gear mechanism portion 36.

The gear cover 51 preferably covers at least an upwind portion of the gear portion (the output gear 41, the input gear 44, and the intermediate gear 46) provided in the gear mechanism portion 36.

(Configuration 2)

When three or more slide door units 25 are serially connected in a lateral direction as described above, the gear cover 51 described above is provided at least for the gear portion of the gear mechanism portion 36 of the middle slide door unit 25 (the slide door unit 25 of the zone C for the rear seats in this case).

Although it is particularly effective to provide the gear cover 51 for the slide door unit 25 of the zone C for the rear seats which is located in the middle, the gear cover 51 can be provided for the gear portions of the gear mechanism portions 36 of the slide door units 25 other than the middle slide door unit 25, i.e. the slide door units 25 of the two zones A and B for the driver seat and the front passenger seat, as a matter of course.

(Configuration 3)

Furthermore, the gear cover 51 is provided to cover at least the output gear 41 directly meshing with the rack portion 35 (an output gear cover 51a).

(Configuration 4)

Moreover, when the gear mechanism portion 36 includes the input gear 44 capable of transmitting the driving force to the output gear 41, the gear cover 51 described above is provided to cover at least the input gear 44 (an input gear cover 51b).

Here, the gear cover 51 may be provided only for the input gear 44 or for the input gear 44, the output gear 41, and the like.

(Configuration 5)

The gear cover 51 is provided to connect both side surfaces of the slide door case 23 (a both-side connecting type gear cover). Moreover, the gear cover 51 includes, in part thereof, portions 51d and 51e having a cylindrical-surface shape extending along an external shape of the gear mechanism portion 36 (the gear portion forming the gear mechanism portion 36).

Figure 11:
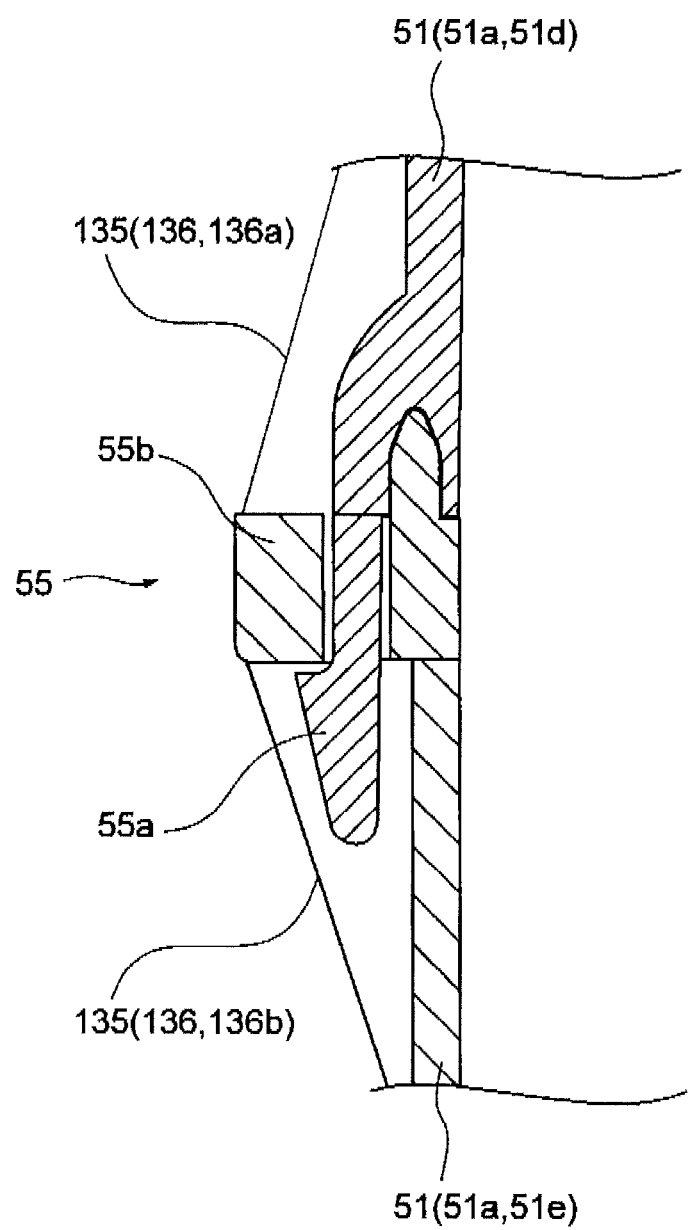
FIG. 11 is a cross-sectional view of the connection portion in FIG. 9.

As described above, the slide door unit 25 of the zone C for the rear seats which is located in the middle is divided into the left and right divided pieces 48a and 48b. Due to this, the both-side connecting type gear cover is also divided into left and right cover pieces mainly formed of the aforementioned portions 51d and 51e having the cylindrical-surface shape. As shown in FIG. 11, a connection portion 55 for connecting the cover pieces of the divided both-side connecting type gear cover may be provided between the cover pieces. The connection portion 55 may designed as one including a locking hook 55a and a hook receiving portion 55b.

The gear cover 51 described above is formed integrally with the slide door case 23 and has such characteristics that it is hard and immovable.

<Effects> Effects of the embodiment are described below.

(Effect 1)

The gear cover 51 covers at least part of the gear portion (the output gear 41, the input gear 44, and the intermediate gear 46) provided in the gear mechanism portion 36. This can prevent the air for air conditioning from blowing directly on the gear mechanism portion 36 (on the gear portion thereof, the same hereafter). This can prevent foreign objects such as debris and dust carried by the air for air conditioning from being caught by the gear mechanism portion 36. In addition, increase in flow resistance and wind noise which are caused by the gear portion can be prevented.

The gear cover 51 effectively functions particularly when the gear mechanism portion 36 is exposed to the flow of the air far air conditioning.

(Effect 2)

The middle slide door unit 25 among the three or more slide door units 25 serially connected is likely to be smaller in size than the other slide door units 25, due to the arrangement thereof and the amount of air passing therethrough. Accordingly, it is difficult to achieve a structure in which the gear mechanism portion 36 is less likely to be exposed to the flow of the air for air conditioning. Hence, the gear cover 51 is provided for the gear mechanism portion 36 of the middle slide door unit 25 and the gear cover 51 is thereby effectively installed in a portion where the cover is most required.

(Effect 3)

Covering the output gear 41 with the gear cover 51 can prevent foreign objects such as debris and dust from being caught by the output gear 41 and prevent increase in flow resistance and wind noise which are caused by the output gear 41.

(Effect 4)

Covering the input gear 44 with the gear cover 51 can prevent foreign objects such as debris and dust from being caught by the input gear 44 and prevent increase in flow resistance and wind noise which are caused by the input gear 44.

(Effect 5)

The gear cover 51 connecting both side surfaces of the slide door case 23 can improve the strength and the stiffness of the slide door case 23. Moreover, the portions 51d and 51e which have the cylindrical-surface-shape and which are provided in at least part of the gear cover 51 have a three-dimensional shape. This can improve the strength and the stiffness of the slide door case 23 compared to the case where the gear cover 51 is planar. Hence, the shape maintaining characteristics of the slide door case 23 is improved without the provision of a reinforcement rib and the like in the gear cover 51 and the slide door case 23, and the assembly accuracy thereof to the air conditioner main body 4 can be improved. Moreover, the portions 51d and 51e having the cylindrical-surface shape can add a rectifying function of rectifying the flow of the air for air conditioning and a distributing function of effectively distributing the air for air conditioning to the warm air opening portion 21 and the cool air opening portion 22.

Embodiment 2

<Configuration> A configuration is described below.

A hollow air conditioner housing 11 includes inside an evaporator 15 (heat exchanger for cooling) and a heater core 16 (heat exchanger for heating) in this order from the upwind side. A portion on the downwind side of the evaporator 15 is divided into a warm air passage 17 and a bypass passage 18 by a partition wall. The heater core 16 is provided inside the warm air passage 17. A mix door 19 is provided between the evaporator 15 and the heater core 16, the mix door 19 being capable of distributing an air for air conditioning having passed through the evaporator 15 to the warm air passage 17 and the bypass passage 18. The mix door 19 is installed at a position close to the evaporator 15.

The evaporator 15 is configured to cool the air for air conditioning by using evaporative latent heat of coolant used in an air conditioner 2. Moreover, the heater core 16 is configured to heat the air for air conditioning by using heat of cooling water heated by an engine.

Figure 4:
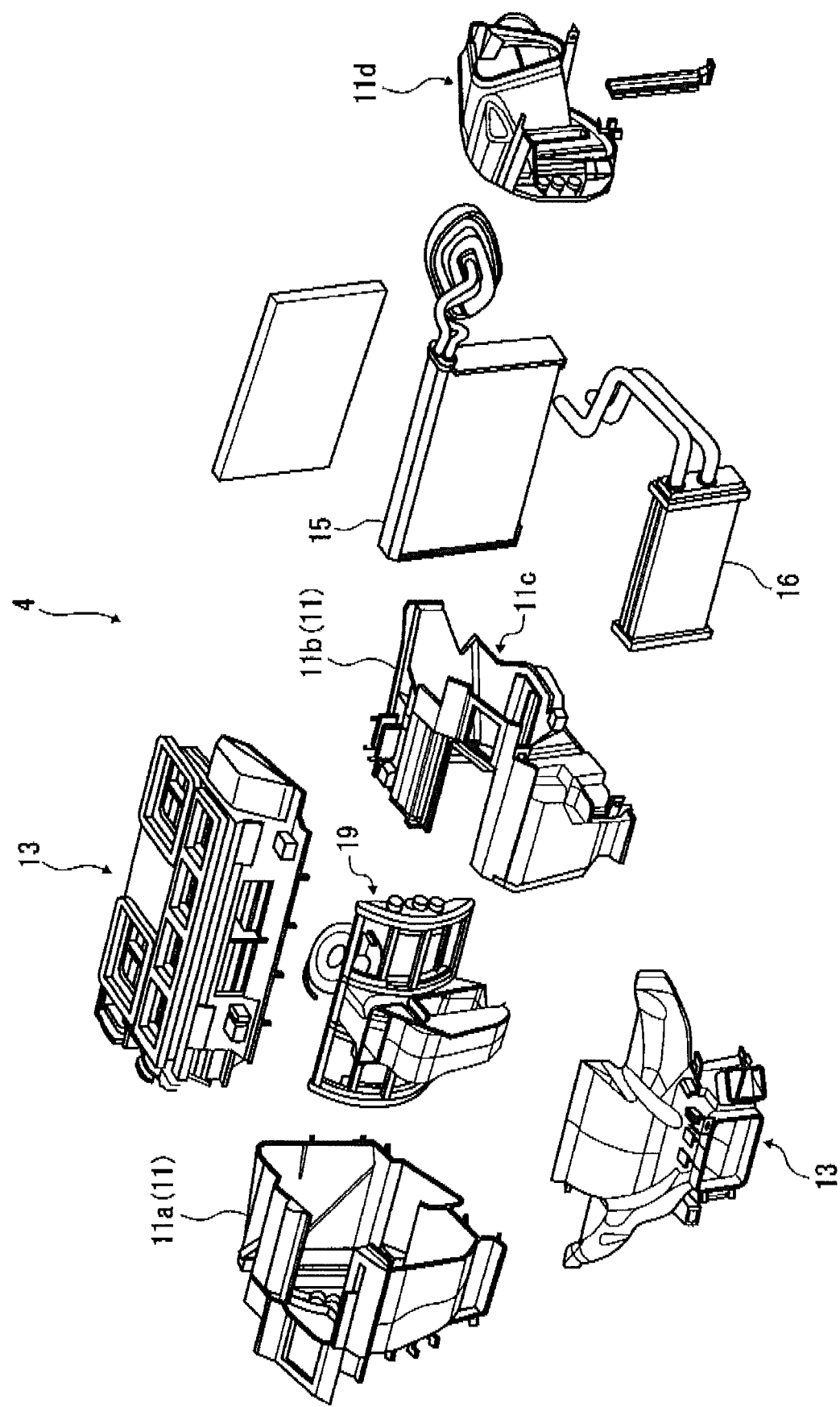
FIG. 4 is an exploded perspective view of the air conditioner main body in FIG. 3.

The air conditioner main body 4 described above is configured to be assembled as follows. As shown in FIG. 4, for example, left and right housing divided pieces 11a and 11b into which the air conditioner housing 11 is divided are mounted to the mix door 19. Then, the evaporator 15 and the heater core 16 are inserted from an opening portion 11c formed in a side surface of the air conditioner housing 11. Thereafter, the opening portion 11c is closed by a side surface member 11d and air delivery units of an air intake port 12 and air discharge ports 13 and the like are attached.

As shown in FIG. 5, the mix door 19 described above includes slide door units 25 each having: a frame-shaped slide door case 23 having a warm air opening portion 21 and a cool air opening portion 22; and a slide door part 24 capable of opening and closing the warm air opening portion 21 and the cool air opening portion 22 or adjusting the opening degrees thereof by sliding along the slide door case 23 between the warm air opening portion 21 and the cool air opening portion 22.

Each of the slide door units 25 described above includes paired door attachment wall parts 26 which enable the slide door part 24 to be attached to both side portions of the slide door case 23. Moreover, each slide door unit 25 includes a slide guide part 28 slideably supporting the slide door part 24, at the position of the door attachment wall parts 26. Furthermore, a slide driving part 29 capable of driving a slide of the slide door part 24 is provided in each slide door unit 25.

The slide guide part 28 described above includes guide pins protruding from both side surfaces of the slide door part 24 and guide groove portions provided in the door attachment wall parts 26. Moreover, the slide driving part 29 described above includes rack portions and a gear mechanism portion, the rack portions provided in the slide door part 24 and extending in a sliding direction, the gear mechanism portion configured to transmit a driving force to the rack portions. The gear mechanism portion is mainly formed of output gears directly meshing with the rack portions and the like. Further details of the slide guide part 28 and the slide driving part 29 are omitted.

Moreover, in this embodiment, an inside of the air conditioner main body 4 is divided into multiple zones and air conditioning can be controlled for each of the zones. For example, the inside of the air conditioner main body 4 may be divided into two zones A and B respectively for a driver seat and a front passenger seat or may be divided into three zones A to C by further adding the zone C for the rear seats. In the case of dividing the inside of the air conditioner main body 4 into the multiple zones A to C, the inside of the air conditioner main body 4 needs to be partitioned according to the number of zones A to C by using partition walls (zone dividing partition walls) and the like. In addition, the mix door 19 also needs to be divided according to the number of zones A to C. For example, independent slide door units 25 are provided respectively for the zones A to C and are integrated by being connected to each other.

Figure 9:
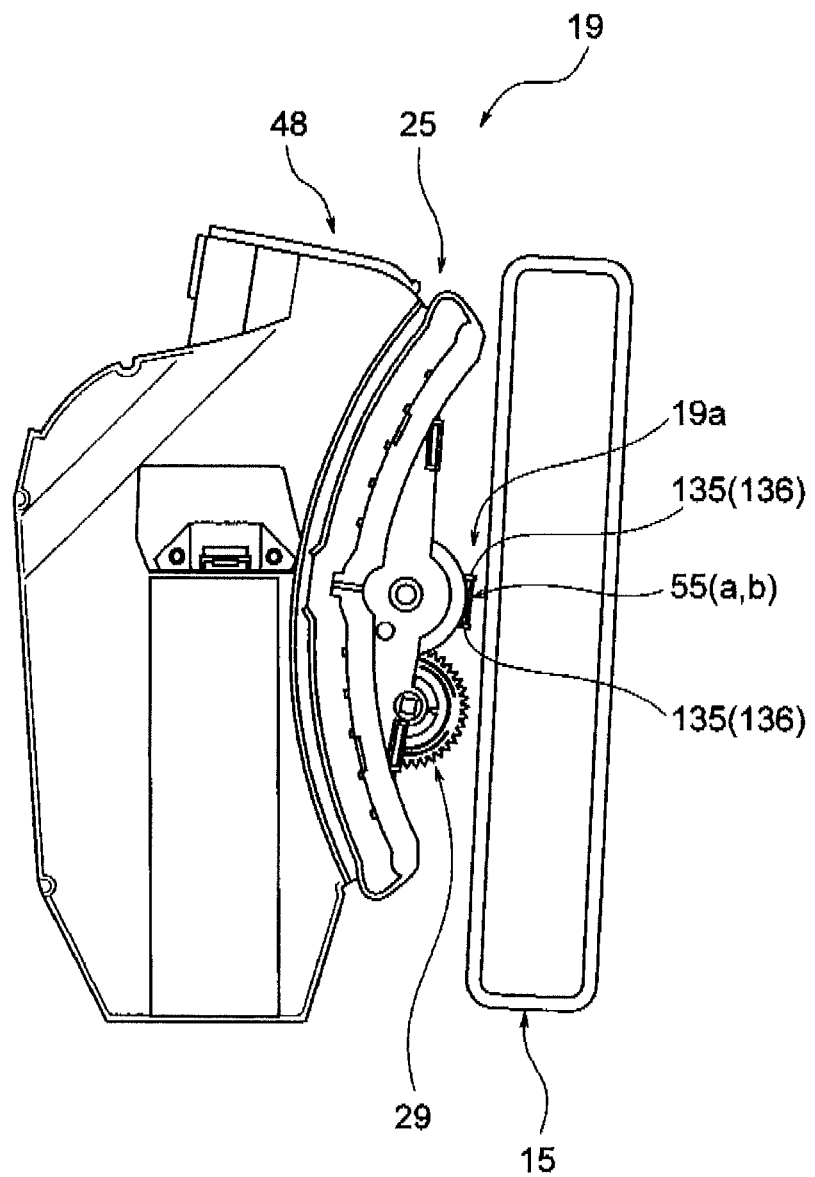
FIG. 9 is an enlarged view of a portion in FIG. 3.
Figure 10:
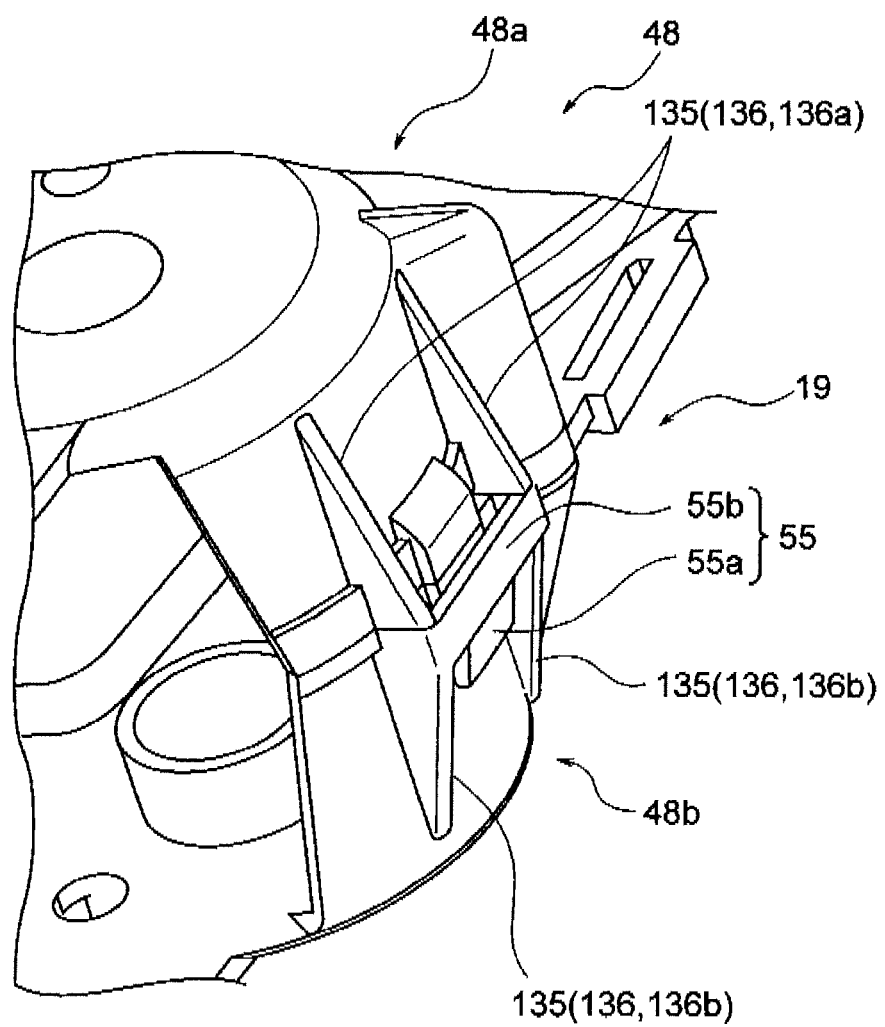
FIG. 10 is an enlarged perspective view of a connection portion of a slide door case.

Moreover, the slide door case 23 of the slide door unit 25 of the zone C for the rear seats which is located in the middle has a partition wall portion 48 (zone dividing partition wall) integrally attached thereto on a downwind side as shown in FIG. 6 and is divided into left and right divided pieces 48a and 48b together with the partition wall portion 48 as shown in FIG. 7. As shown in FIGS. 9 to 11, the left and right divided pieces 48a and 48b are locked to each other on a upwind side by connection portion 55 formed of a hook portion 55a and a hook receiving portion 55b.

(Configuration 1)

As shown in FIG. 9, a damage prevention guide portion 135 is provided at least in a portion 19a of the above-described mix door 19 which is closest to the evaporator 15, the damage prevention guide portion 135 being capable of preventing damage on the evaporator 15 by guiding the evaporator 15 when the evaporator 15 is inserted.

The damage prevention guide portion 135 can be provided in portions other than the one described above and in portions of the mix door 19 corresponding to the zones A and B.

(Configuration 2)

Assume a case where, as described above, the mix door 19 is divided into three or more slide door units 25 in the width direction of the air conditioner housing 11, the slide door case 23 of the middle slide door unit 25 is divided into the left and right divided pieces 48a and 48b, the left and right divided pieces 48a and 48b are connected to each other by the hook portion 55a and the hook receiving portion 55b, and the hook portion 55a and the hook receiving portion 55b are the portion 19a of the mix door 19 which is closest to the evaporator 15. In this case, as shown in FIGS. 10 and 11, the damage prevention guide portion 135 described above can protect the hook portion 55a and the hook receiving portion 55b described above.

(Configuration 3)

Paired guide ribs 136 serves as the damage prevention guide portion 135 described above, the guide ribs 136 extending in a direction in which the evaporator 15 is mounted onto the air conditioner housing 11 and being capable of protecting both side portions of the hook portion 55a and the hook receiving portion 56b.

(Configuration 4)

The paired guide ribs 136 each have inclined surfaces 136a and 136b, which are inclined upward toward a top portion of the hook receiving portion 55b.

The inclined surfaces 136a and 136b are provided respectively on both sides of the top portion of the hook receiving portion 55b.

<Effects> Effects of the embodiment are described below.

The evaporator 15 is inserted from the opening portion 11c formed in the side surface of the air conditioner housing 11.

(Effect 1)

At least the damage prevention guide portion 135 provided in the portion 19a of the mix door 19 which is closest to the evaporator 15 can guide the evaporator 15 in such a way that the evaporator 15 is not damaged when being inserted into the air conditioner housing 11.

(Effect 2)

The damage prevention guide portion 135 can simultaneously protect the hook portion 55a and the hook receiving portion 55b which connect the left and right divided pieces 48a and 48b of the middle slide door unit 25 to each other.

(Effect 3)

The paired guide ribs 136 serving as the damage prevention guide portion 135 protect both side portions of the hook portion 55a and the hook receiving portion 55b and extend in the mounting direction of the evaporator 15. This can prevent an increase in resistance during the mounting of the evaporator 15 which is caused by the damage prevention guide portion 135.

(Effect 4)

The paired guide ribs 136 each have the inclined surfaces 136a and 136b which are inclined upward toward the top portion of the hook receiving portion 55b. Hence, the guide ribs 136 can gradually guide the evaporator 15 in such a way that the evaporator 15 is not scratched hard against the top portion of the hook receiving portion 55b during the insertion of the evaporator 15. In addition, the guide ribs 136 can position the hook receiving portion 55b in the height direction.

The embodiments of the present invention have been described above in detail by using the drawings. However, the embodiments are merely examples of the present invention and the present invention is not limited to the configurations of the embodiments. Modifications in design which do not depart from the gist of the present invention are also included in the present invention, as a matter of course. Moreover, for example, when multiple configurations are included in each embodiment, possible combinations of these configurations are included in the present invention as a matter of course, even if they are not particularly described. Furthermore, when multiple embodiments and modifications are shown, any possible combinations of configurations among these embodiments and modifications are included in the present invention as a matter of course, even if they are not particularly described. In addition, the configurations illustrated in the drawings are included in the present invention as a matter of course, even if they are not particularly described. Moreover, when a term "and (or) the like" is used, this means that similar objects are also included. Furthermore, when terms such as "almost", "approximately", and "about" are used, this means that values or the like within a range or accuracy which is acceptable from a common sense point of view are also included.

What is claimed is:

1. A mix door comprising: at least three slide door units serially connected to one another; a slide driving part configured to drive each of the slide door units; and a gear cover partially covering the slide driving part, wherein the slide driving part includes a gear mechanism portion formed of a rack portion and a gear assembly, the at least three slide door units include a middle slide door unit having an output gear directly meshing with the rack, and each of the slide door units includes a slide door case, and wherein the gear cover is provided to cover the output gear and connect both side surfaces of the slide door case, the slide door case of the middle slide door unit is divided into at least two slide door case pieces, and the gear cover is divided into at least two gear cover portions connected by a connection portion.

2. The mix door according to claim 1, wherein the gear assembly includes an input gear transmitting a driving force to the output gear; and the gear cover covers the input gear.

3. The mix door according to claim 1, wherein the gear cover includes a portion having a cylindrical-surface shape extending along an external shape of the gear mechanism portion.

4. A vehicle air conditioner comprising:
a hollow air conditioner housing; and
an evaporator and the mix door according to claim 1 which are provided inside the housing.

5. A vehicle air conditioner comprising: a hollow air conditioner housing; the mix door according to claim 1 which is provided inside the housing; an evaporator configured to be mounted inside the housing near the mix door by being inserted from an opening portion provided in a side surface portion of the housing, wherein the at least two side door case pieces of the middle slide door unit of the mix door formed of three or more slide door units serially connected to one another, include left and right case pieces, and the gear cover includes a hook portion and a hook receiving portion connecting the left and right case pieces; and paired guide ribs formed to extend in a mounting direction of the evaporator and capable of protecting both side portions of the hook portion and the hook receiving portion.

6. A vehicle air conditioner comprising: a hollow air conditioner housing; the mix door according to claim 1 which is provided inside the housing; an evaporator configured to be mounted inside the housing near the mix door by being inserted from an opening portion provided in a side surface portion of the housing; wherein the at least two slide door case pieces of the slide door case of the middle slide door unit include left and right case pieces, and the gear cover includes a hook portion and a hook receiving portion connecting the left and the right case pieces; paired guide ribs formed to extend in a mounting direction of the evaporator and capable of protecting both side portions of the hook portion and the hook receiving portion, wherein each of the guide ribs includes an inclined surface inclined upward toward a top portion of the hook receiving portion.

7. A vehicle air conditioner comprising: a hollow air conditioner housing; the mix door according to claim 1 which is provided inside the housing; an evaporator configured to be mounted inside the housing near the mix door by being inserted from an opening portion provided in a side surface portion of the housing; wherein the at least two slide door pieces of the slide door case of the middle slide door unit include left and right case pieces, and the gear cover includes a hook portion and a hook receiving portion connecting the left and right case pieces; paired guide ribs formed to extend in a mounting direction of the evaporator and capable of protecting both side portions of the hook portion the hook receiving portion, wherein each of the guide ribs includes an inclined surface inclined upward toward a top portion of the hook receiving portion.

* * * * *